Figure 1:
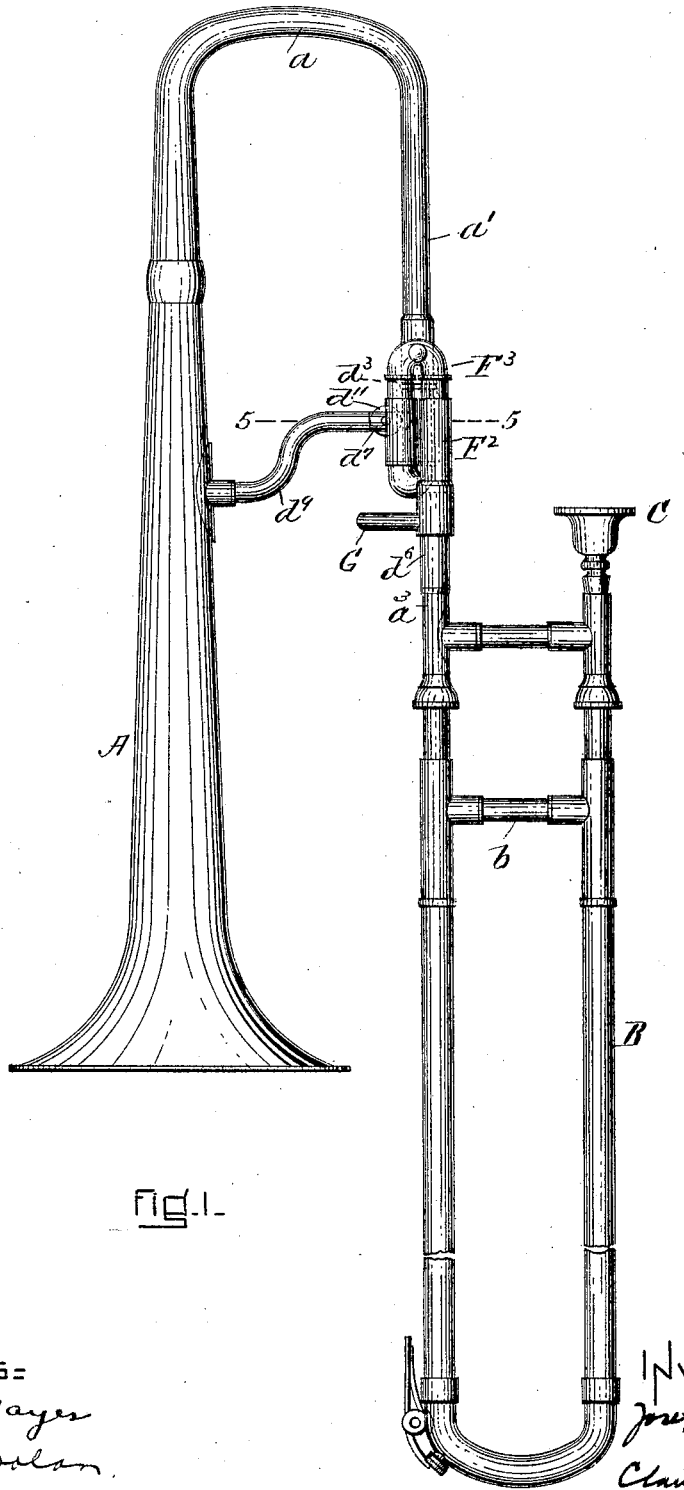

No. 699,681. Patented May 13, 1902.
J. HANKEY.
SLIDE TROMBONE.
(Application filed June 15, 1901.)

(No Model.) 2 Sheets—Sheet 1.

Witnesses:
J. E. R. Hayes
J. M. Dolan

Inventor:
Joseph Hankey
by his attys
Clarke & Raymond

No. 699,681. Patented May 13, 1902.
J. HANKEY.
SLIDE TROMBONE.
(Application filed June 15, 1901.)
(No Model.) 2 Sheets—Sheet 2.

UNITED STATES PATENT OFFICE.

JOSEPH HANKEY, OF BOSTON, MASSACHUSETTS.

SLIDE-TROMBONE.

SPECIFICATION forming part of Letters Patent No. 699,681, dated May 13, 1902.

Application filed June 15, 1901. Serial No. 64,713. (No model.)

*To all whom it may concern:*

Be it known that I, JOSEPH HANKEY, a citizen of the United States, and a resident of Boston, (Jamaica Plain,) in the county of Suffolk and State of Massachusetts, have invented a new and useful Improvement in Slide-Trombones, of which the following is a full, clear, and exact description, reference being had to the accompanying drawings, forming a part of this specification, in explaining its nature.

Heretofore slide-trombones have had two methods of changing their pitch from high to low. Both methods are substantially of the same character and each involves a construction at one of the bends of the instrument whereby the wind-passage of the instrument may be lengthened. The means for accomplishing this in each instance calls for a construction between the bend and the remainder of the instrument whereby the bend may be moved in or out with respect to the instrument, thereby lengthening or shortening the instrument, according as it is moved. In the one case it is applied to the bend of the bell, in the other case to the bend of the slide. The latter is the less objectionable; but both constructions are undesirable in that they change the balance of the instrument in the hand, cause wear where it is undesirable, and affect the quality of the tone and tune of the instrument or the playing of it. It is desirable that the instrument should have a certain kind of balance in the hand and that that balance should be maintained as nearly as possible in the playing of the instrument. This balance is one that tends to incline the upper end of the instrument slightly backward and to consequently throw the lower end forward. It is obvious that extending either the upper or lower ends of the instrument will materially disturb the balance. My invention permits this balance to be obtained and preserved. It accomplishes this result by so constructing the instrument that the change in the length of the inner passage required for making the change in pitch takes place at or near the center of the instrument and where it is grasped by the hand rather than at either end of it, and as either end of the instrument is no longer extensible the balance of the instrument in the hand is constantly maintained. My invention also works an advantage in that the instrument plays easier, giving an improved equality and a greater body of tone, and in that the adjustment of the instrument does not throw it out of tune.

I will now describe the invention in conjunction with the drawings forming a part of this specification, wherein—

Figures 2, 3, 4:
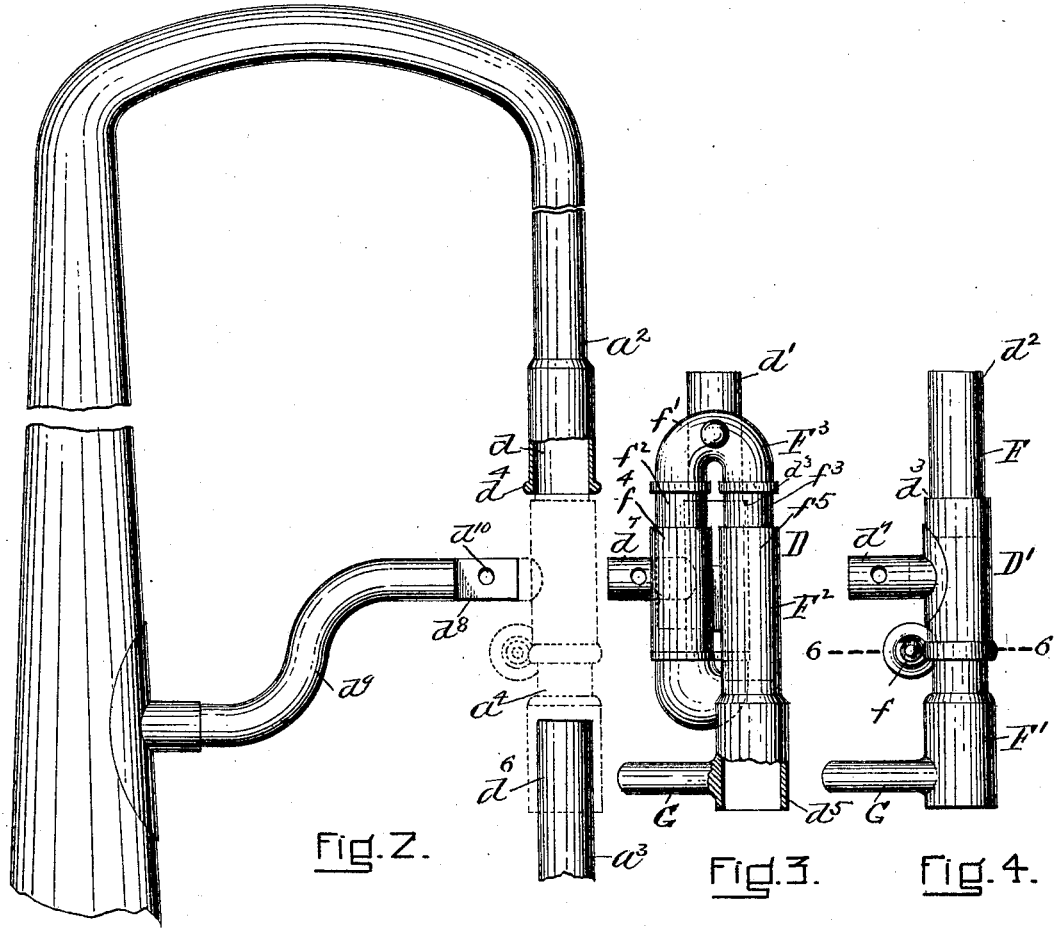
Figure 5:
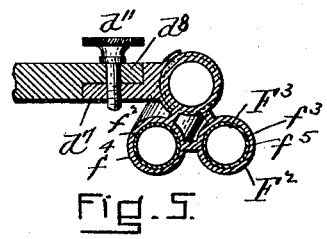
Figure 6:

Figure 1 is a view in elevation of a trombone supplied with a low-pitch transformer. Fig. 2 is a detail view thereof, showing the instrument without either the low-pitch or the high-pitch transformer and indicating how either may be attachable to and detachable from it. Fig. 3 is a view of the detached low-pitch transformer. Fig. 4 is a view of the detached high-pitch transformer. Fig. 5 is a view in section upon the dotted line 5 5 of Fig. 1. Fig. 6 is a view in section upon the dotted line 6 6 of Fig. 4.

Referring to the drawings, the instrument has the usual parts of a slide-trombone, and A represents the bell, $a$ the bell-bend, B the playing-slide, which is operated by the handle $b$, and C is the mouthpiece.

Instead of making the portion or tube $a'$ extending from the bell-bend into the slide continuous, as in former instruments, it is separated into the sections $a^2$ and $a^3$, separated by a space $a^4$, adapted to be filled by one or the other of the two transformers. The part $a^2$ forms a portion of the bell, and the part $a^3$ carries the slide. The part $a^2$ is slightly enlarged to form a socket $d$ enough larger than the wind-passage to receive the end $d'$ of the low-pitch transformer D and the end $d^2$ of the high-pitch transformer D' and without decreasing or increasing the size of the wind-passage either in the part $a^2$ or in the transformer. Each transformer has a shoulder $d^3$, against which the end $d^4$ of the socket may come into contact, and each transformer also has a socket $d^5$ to receive the upper end $d^6$ of the playing-slide section $a^3$, the socket being of sufficient size to receive the said end and without varying the bore of the wind-passage in the transformer or in said section. Each transformer also has means by which is is secured to the instrument, and I have represented such means as comprising an arm or bracket $d^7$, extending laterally from the transformer, about midway its length, having a flat inner face, a curved outer one, and a shoulder at its end adapted to fit upon and against the end $d^8$ of a handle or brace $d^9$, which is reversely shaped to receive it. Each of these parts has a threaded hole $d^{10}$, which when the two parts are together come into line with each other and provide means whereby they may be fastened together by a fastening-screw $d^{11}$. (See Fig. 5.) The high-pitch transformer has a single straight inner passage, which may be slightly lengthened for tuning the pitch. The low-pitch transformer has an inner passage of increased length, to accommodate which it is shaped as represented in Figs. 1 and 3—viz., with two return-bends, first backward and then onward, so that for a short space there are three sections of the passage in line. (See section Fig. 5.)

To tune the high-pitch transformer, it is made in the parts F F', the part F' telescoping in the part F without varying the size of the inner passage and being secured in any desired position thereto by a clamp $f$. The low-pitch transformer D is also made in two parts for the same purpose—viz., the part $F^2$ and the part $F^3$. This latter part telescopes into the part $F^2$ and comprises a bend $f'$ and two tubular extensions $f^2 f^3$, which slide in the tubular parts $f^4 f^5$ of the section $F^2$. Each transformer is thus provided with means for slightly varying the length of its inner passage, whereby the tuning of the pitch is accomplished. Each transformer may also have a thumb or other rest G extending laterally from it and integral with it. (See Figs. 1, 3, and 4.)

In use either the high-pitch transformer or the low-pitch transformer is made a part of the instrument, according as it is desired that its pitch shall be high or low, each transformer being detachably secured to the rest of the instrument and being interchangeable in the instrument the one for the other. The instrument is held by the left hand at about the place where the transformer is inserted, and consequently the change from one transformer to the other does not affect the balance of the instrument. As the transformers are inserted into the instrument at a place where the inner passage is of the same diameter and as they continue the same diameter, no change in the quality of the tone of the instrument is caused by the substitution of one for the other, and the low-pitch transformer does not require an appreciably larger volume of air to fill it before playing, so that no difference in the playing effect is evident whichever of the transformers is in use.

Having thus fully described my invention, I claim and desire to secure by Letters Patent of the United States—

1. A trombone having a detachable pitch-transformer at or near the center of the length of the instrument.

2. A trombone provided with a detachable pitch-transformer at or near the center of its length, the said pitch-transformer having a tuning-slide.

3. A trombone having a detachable transformer in its cylindrical section $a'$ and at or near the center of the length of the instrument, the passage of which is of the bore of the passage of said section.

4. A trombone comprising the bell, a bend, a straight section at the end of the bell, a separate section to which the slide is attached, and an interposed removable section attached to the instrument and connecting the two parts and forming a pitch-transformer.

5. A trombone comprising the bell, a bend, a straight section at the end of the bell, a separate section to which the slide is attached, and an interposed removable section attached to the instrument and connecting the two parts and forming a pitch-transformer, the said pitch-transformer also having attached tuning means.

6. A trombone having a bell provided with a bend and a return-section $a'$, the end of which forms a part of a joint, the section $a^3$ of the transformer carrying the playing-slide, a mouthpiece, the end of which also forms a part of the joint, a handle or brace attached to the bell, and a high or low pitch transformer attached to the slide or handle and having joints which connect it with the said two parts of the instrument.

7. A trombone having a handle or brace and a detachable section of the instrument secured to said handle or brace and detachably connected with the bell of the instrument and with the playing sliding section.

8. A trombone comprising three sections or parts, viz: first, the section comprising the bell and the continuous, inextensible bell end; second, the section embracing the playing-slide; third, one or two or more detachable pitch-transformers one of which pitch-transformers combines the bell and slide sections at or near the center of the length of the instrument and either of which pitch-transformers completes the instrument.

9. A trombone having a bell and an inextensible bend, the end of which is fitted to receive an end of a detachable pitch-transformer, a section embracing a playing-slide, the end of which is fitted to receive an end of a detachable pitch-transformer and said detachable pitch-transformer having means for attachment to the bell-section and the playing-slide section and connecting the playing-slide section with the bell-section.

10. A trombone having a removable transformer at or near the center of its length and a rest extending from said transformer.

11. A trombone constructed at or near the center of its length to receive a removable pitch-transformer, the said removable pitch-transformer and means in said pitch-transformer for varying the length of its wind-passage.

JOSEPH HANKEY.

Witnesses:
J. E. R. HAYES,
J. M. DOLAN.